United States Patent Office 3,763,149
Patented Oct. 2, 1973

3,763,149
BIOLOGICALLY ACTIVE 17 ALPHA-ETHYNYL-
16,17-DIHYDROXY-13-ALKYLGON-4-EN-3-ONES
Reinhardt P. Stein, Audubon, Pa., assignor to American
Home Products Corporation, New York, N.Y.
No Drawing. Filed July 21, 1972, Ser. No. 274,005
Int. Cl. C07c 169/22, 173/00
U.S. Cl. 260—239.55
4 Claims

ABSTRACT OF THE DISCLOSURE

13 - alkylgona - 16α-hydroxy-3-methoxygona-1,3,5(10)-trien-17-one is converted to its 16α-tetrahydropyranyloxy derivative which is in turn reduced to the corresponding 17β-ol. This compound is converted by Birch reduction to the corresponding 2,5(10)-diene which in turn is oxidized to the 17-ketone. Treatment of the 17-ketone with ethynyl Grignard followed by acid hydrolysis affords the 16α-hydroxy title compound. Treatment of the 17-ketone with lithium acetylide-ethylene diamine complex affords the 16β-hydroxy title compound. The title compounds have progestational activity.

DESCRIPTION OF THE INVENTION

The invention sought to be patented in a first composition aspect resides in the concept of a compound of the structure

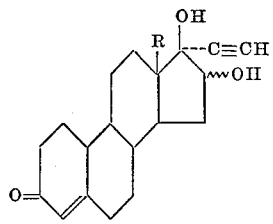

wherein R is alkyl of from 1 to 4 carbon atoms. The symbol ∼ indicates that the configuration at carbon atom 16 is either α or β; both are included in the invention.

The tangible embodiments of the first composition aspect of the invention possess the inherent applied use characteristic of exerting progestational effects upon administration to warm-blooded animals.

The invention sought to be patented in a second composition aspect resides in the concept of a compound of the structure

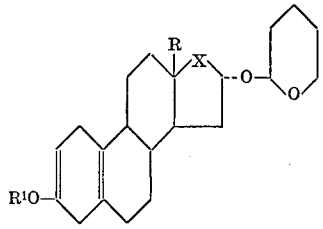

wherein R is alkyl of from 1 to 4 carbon atoms, $R^1$ is alkyl of from 1 to 8 carbon atoms, and X is C=O or

The tangible embodiments of the second composition aspect of the invention possess the inherent applied use characteristic of being intermediates in the preparation of the compounds of the first composition aspect of the invention.

The invention sought to be patented in its process aspect resides in the concept of a process for the preparation of a 13-alkyl-16β,17β-dihydroxy-17α-ethynylgon-4-en-3-one compound which comprises treating a compound of the structure

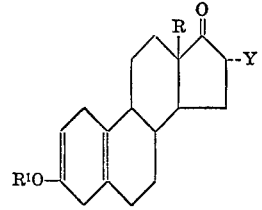

wherein R is alkyl of from 1 to 4 carbon atoms, $R^1$ is alkyl of from 1 to 8 carbon atoms, and Y is a protected hydroxyl group, with lithium acetylide-ethylene diamine complex in dimethylsulfoxide/benzene, followed by acid hydrolysis.

In the following description of the process aspect of the invention and the preparation of the composition aspects of the invention, reference will be made, for convenience, to a particular embodiment thereof wherein R is ethyl. It is to be understood, however, that this discussion is equally applicable to all embodiments of the invention.

Referring to the following flow chart, where the compounds are assigned Roman numerals for ease of identification, the starting material, 13-ethyl-16α-hydroxy-3-methoxygona-1,3,5(10)-trien-17-one (I) may be prepared by means known to those skilled in the art (British Pat. 1,115,954). Reaction of I with dihydropyran, for example in the presence of ethanol, pyridine, and acetyl chloride, in benzene affords 13-ethyl-3-methoxy-16α-(tetrahydropyran-2-yloxy)-gona - 1,3,5(10) - trien-17-one (II), which upon reduction of the 17-carbonyl function, for example with lithium aluminum tri-tert. butoxyhydride in tetrahydrofuran or with sodium borohydride in methanol, yields 13 - ethyl - 3 - methoxy-16α-(tetrahydropyran-2-yloxy)-gona-1,3,5(10)-trien-17β-ol (III). Reduction of III under Birch conditions with lithium metal and liquid ammonia affords 13 - ethyl - 3 - methoxy - 16α - (tetrahydropyran-2-yloxy)gona-2,5(10)-dien-17β-ol (IV), which, upon oxidation with dimethylsulfoxide and acetic anhydride affords the corresponding 17-one compound (V). Treatment of V with ethynyl Grignard such as ethynyl magnesium bromide in a solvent such as tetrahydrofuran followed by hydrolysis with aqueous mineral acid, such as aqueous hydrochloric acid in a miscible solvent such as methanol affords the product 16α,17β-dihydroxy-13-ethyl-17α-ethynylgon-4-en-3-one (VI). Treatment of V with lithium acetylide-ethylene diamine complex in dimethylsulfoxide/benzene affords the epimeric product 16β,17β-dihydroxy-13-ethyl-17α-ethynylgon-4-en-3-one (VII).

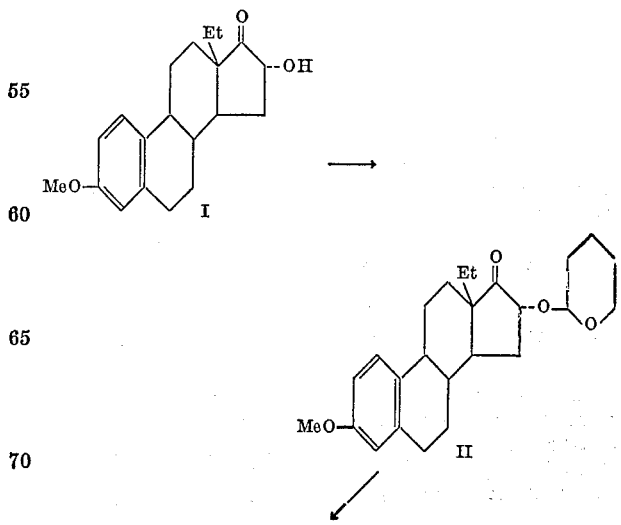

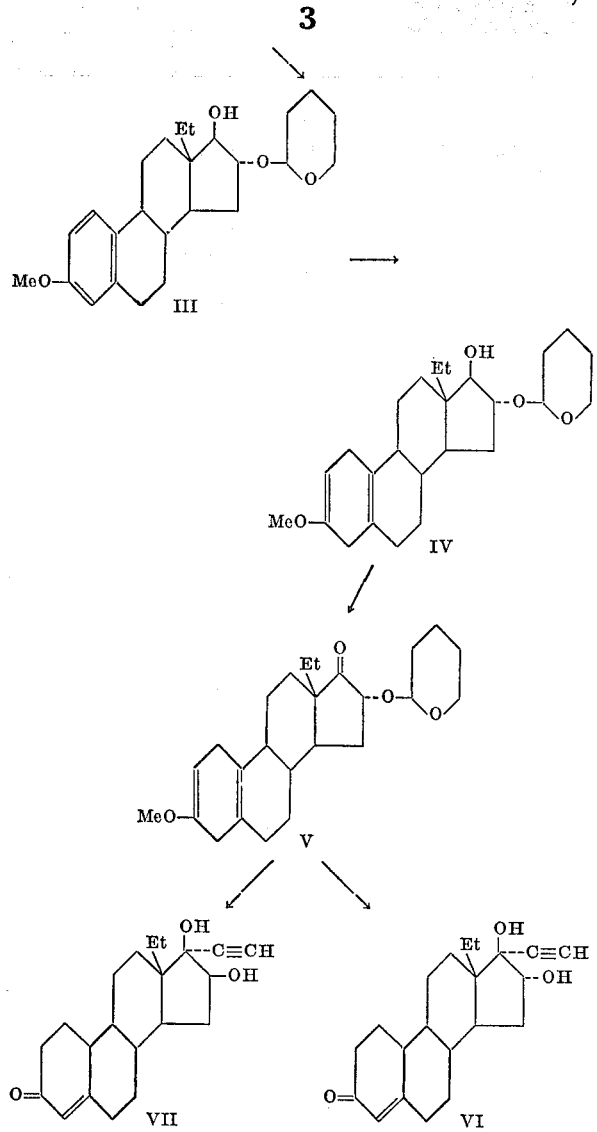

While the discussion of reaction step V to VII involved a reactant containing a tetrahydropyranyloxy substituent at position 16, it is to be understood that this aspect of the invention is not so limited. Any of the various groups known as protecting groups for an hydroxyl function may be used instead of tetrahydropyranyloxy, so long as they are stable under the basic conditions of the reaction and are readily removable thereafter.

In employing the compounds of the first composition aspect of the invention to produce a progestational effect, the compounds may be administered by either oral or parenteral routes. The amount of compound to be administered will vary depending on the route of administration, the particular compound employed, the particular animal involved, and the degree of response desired. Ideally, the dosage should be individualized in each case. Generally, a dose of 1 mg./kg. body weight will be sufficient to produce the desired progestational effect.

The following examples further illustrate the best mode contemplated by the inventor of carrying his invention:

EXAMPLE 1 dl-13-ethyl-3-methoxygona-1,3,5(10)-trien-16α,17β-diol, 16-formate

Cool dimethylformamide (60 ml.) with a methanol-ice bath, drip in methanesulfonyl chloride (10 ml.) with stirring followed by dl-13-ethyl-2-methoxygona-1,3,5(10)-triene-16α,17β-diol (3.00 g.). Stir, remove the cold bath and continue stirring at room temperature for 1 hour. Pour the reaction into a solution of pyridine (35 ml.) in ice-water. Stir for 1 hour then extract with ethyl acetate-ether. Wash, dry and evaporate the extract in vacuo. Dissolve the residue in methylene chloride, treat with activated charcoal, filter and evaporate the methylene chloride in vacuo. Cover the oil with heptane, warm and dilute with benzene. Let stand to crystallize. Filter to obtain 2.59 g., M.P. 146–148°. Purify a sample (0.58 g.) by retreatment with charcoal as above and crystallize from isopropanol to get 0.43 g. of the pure title product, M.P. 153–155°.

$\lambda_{max.}^{KBr}$ 2.85 to 3.0 and 5.84μ

Analysis (percent): C, 73.28; H, 8.23. Calcd. for $C_{21}H_{28}O_4$ (percent): C, 73.22; H, 8.19.

EXAMPLE 2 dl-13-ethyl-3-methoxy-16α-hydroxygona-1,3,5(10)-trien-17-one, formate

Dissolve dl - 13-ethyl-3-methoxygona-1,3,5(10)-triene-16α,17β-diol, 16-formate (2.00 g.) in acetone (50 ml.), stir then drip in 8 N chromic acid solution (total 3 ml.) over 0.5 hour. Stir 10 minutes more than add isopropanol (30 ml.) followed by water (250 ml.). Extract the mixture with ethyl acetate then wash, dry and evaporate the extract in vacuo. Treat the resulting oil in methylene chloride with activated charcoal, filter and evaporate in vacuo. Crystallize the oil from isopropanol to get 1.56 g. of the pure title product, M.P. 125–128°.

$\lambda_{max.}^{KBr}$ 5.72 and 5.81μ

Analysis (percent): C, 73.84; H, 7.96. Calcd. for $C_{21}H_{26}O_4$ (percent): C, 73.66; H, 7.66.

EXAMPLE 3 dl-13-ethyl-3-methoxy-16α-hydroxygona-1,3,5(10)-trien-17-one

Cool a solution of sodium hydroxide (0.80 g.) in methanol (60 ml.) to about −5° C., then add dl-13-ethyl-3 - methoxy - 16α - hydroxygona-1,3,5(10)-trien-17-one, formate (2.00 g.). Stir the cold reaction for 45 minutes then quench by adding cold saturated ammonium chloride solution (200 ml.) dropwise. Filter and dry the resulting precipitate then dissolve it in methylene chloride and treat with activated charcoal. Filter, evaporate the solvent in vacuo and dissolve the oil in hot isopropanol. Let cool and stand to crystallize. Filter to obtain 1.26 g. of the pure title product, M.P. 158–161°.

$\lambda_{max.}^{KBr}$ 2.96 and 5.78μ

Analysis (percent): C, 76.62; H, 8.71. Calcd. for $C_{20}H_{26}O_3$ (percent): C, 76.40; H, 8.34.

EXAMPLE 4 dl-13-ethyl-3-methoxy-16α-(tetrahydropyran-2-yloxy)gona-1,3,5(10)-trien-17-one

Mix dl - 13 - ethyl-3-methoxy-16α-hydroxygona-1,3,5-(10)-trien-17-one (9.0 g.) with benzene (60 ml.), absolute ethanol (1.2 ml.), pyridine (1.8 ml.) acetyl chloride (1.5 ml.) and distilled dihydropyran (30 ml.). Allow the reaction to stand at room temperature with occasional swirling for 6 days. Dilute with ether then wash the extract with saturated sodium bicarbonate solution, water brine and dry with anhydrous sodium sulfate. Filter and evaporate the solvent in vacuo. Dissolve the oil in benzene, pass the solution through a short column of fuller's earth and wash the column with benzene. Evaporate the solvent in vacuo and crystallize the resulting oil from methanol to obtain 7.52 g. of pure title product, M.P. 104°–106°, $\lambda_{max.}^{KBr}$ 5.73μ

Analysis (percent): C, 75.09; H, 8.50. Calcd. for $C_{25}H_{34}O_4$ (percent): C, 75.34; H, 8.60.

EXAMPLE 5

*dl*-13-ethyl-3-methoxy-16α-(tetrahydropyran-2-yloxy) gona-1,3,5(10)-trien-17β-ol Cool tetrahydrofuran (50 ml.) with a methanol-ice bath, add lithium aluminum tritert.butoxy hydride (1.5 g.) then add *dl*-13-ethyl-3-methoxy-16α-(tetrahydropyran-2-yloxy)gona-1,3,5(10)-trien-17-one (1.00 g.) and continue stirring, allowing to warm to room temperature, for 18 hours. Add water (5 ml.) stir, then follow with more water (200 ml.) added dropwise with stirring. Extract with ether then wash, dry and evaporate the extract in vacuo. Crystallize the resulting gum from ether-hexane to get 0.69 g. of the title product, M.P. 130–139°.

EXAMPLE 6

*dl*-13-ethyl-3-methoxy-16α-(tetrahydropyran-2-yloxy) gona-1,3,5(10)-trien-17β-ol Stir a mixture of *dl*-13-ethyl-3-methoxy-16α-(tetrahydropyran - 2 - yloxy)gona-1,3,5(10)-trien-17-one (2.00 g.) and methanol (50 ml.) with cooling then add sodium borohydride (1.00 g.). Stir the cooled reaction for 3 hours, then at room temperature add a further 1.00 g. of sodium borohydride, with stirring, in small portions over a period of 2 hours. Continue stirring at room temperature overnight. Add water (200 ml.) then filter the resulting precipitate onto filter-aid. Dry the mixture, extract with tetrahydrofuran, filter and evaporate the solvent in vacuo. Crystallize the oil from ether-hexane to get 1.66 g. of title product, M.P. 132–138.

$\lambda_{max.}^{KBr}$ 2.97μ

Analysis (percent): C, 75.12; H, 9.22. Calcd. for $C_{25}H_{36}O_4$ (percent): C, 74.96; H, 9.06.

EXAMPLE 7

*dl*-13-ethyl-3-methoxygona-1,3,5(10)-triene-16α,17β-diol

Dissolve *dl*-13-ethyl-3-methoxy-16α-(tetrahydropyran-2-yloxy)gona-1,3,5(10)-trien - 17β - ol (500 mg.) in methanol (20 ml.), stir then add conc. hydrochloric acid (10 drops). Stir at room temperature for 1 hour then add water (150 ml.) dropwise, stir 0.5 hour then filter the precipitate onto filter-aid. Dry the mixture, extract with tetrahydrofuran, filter and evaporate the extract in vacuo. Treat the residue in tetrahydrofuran with activated charcoal, filter and evaporate in vacuo. Crystallize from absolute ethanol to get 210 mg. of the title product, M.P. 189–191°

$\lambda_{max.}^{KBr}$ 3.0μ

EXAMPLE 8

*dl*-13-ethyl-3-methoxy-16α-(tetrahydropyran-2-yloxy) gona-2,5(10)-dien-17β-ol

Dissolve *dl*-13-ethyl - 3 - methoxy - 16α - (tetrahydropyran-2-yloxy)gona-1,3,5(10) - trien - 17β - ol (3.0 g.) in dry tetrahydrofuran (80 ml.), add 1-methoxy-2-propanol (50 ml.) and distilled liquid ammonia (300 ml.), stir at the temperature of liquid ammonia then add lithium metal (5.0 g.) in small pieces at a rate to prevent vigorous refluxing of the ammonia (Dry-Ice acetone condenser) over a period of 3 hours. Stir for an additional 1 hour then add enough absolute ethanol to quench the blue color. Add solid ammonium chloride (30 g.) then hot water to drive-off the ammonia. Filter the precipitate onto filter-aid, dry and extract the mixture with tetrahydrofuran. Evaporate the solvent in vacuo then dissolve the oil in ether-tetrahydrofuran and a little pyridine, treat with activated charcoal, filter and evaporate in vacuo. Crystallize from hexane to get 1.85 g. of the title product, M.P. 150–156°.

$\lambda_{max.}^{KBr}$ 3.0, 5.88 and 5.99μ

Evaporate the mother liquors in vacuo and crystallize the oil from methanol to get a further 0.45 g. of the title product in a different crystalline modification, M.P. 132–136°.

$\lambda_{max.}^{KBr}$ 2.98, 5.90 and 6.02μ

Analysis (percent): C, 74.35; H, 9.54. Calcd. for $C_{25}H_{38}O_4$ (percent): C,74.59; H, 9.52.

EXAMPLE 9

*dl*-13-ethyl-3-methoxy-16α-(tetrahydropyran-2-yloxy)gona-2,5(10)-dien-17-one

Suspend *dl*-13-ethyl-3-methoxy-16α-(tetrahydropyran-2-yloxy)gona-2,5(10)-dien-17β-ol (1.50 g.) in DMSO (25 ml.) and acetic anhydride (6 ml.) and let stand with occasional swirling for 2 hours. Rinse the side of the flask with 5 ml. more of DMSO and let the reaction stand at room temperature for 22 hours. Pour the reaction into ice-saturated sodium bicarbonate solution. Filter and dry the resulting precipitate then dissolve the solid in ether containing a little pyridine, treat with activated charcoal, filter and evaporate the solvent in vacuo. Crystallize the oil from methanol to get 0.89 g. of the pure title product, M.P. 124–128°.

$\lambda_{max.}^{KBr}$ 2.95 to 3.10, 5.75, 5.90 and 6.00μ

Analysis (percent): C, 74.85; H, 8.95. Calcd. for $C_{25}H_{36}O_4$ (percent): C, 74.96; H, 9.06.

EXAMPLE 10

*dl*-13-ethyl-17α-ethynyl-16β,17β-dihydroxygon-4-en-3-one

Dissolve *dl*-13-ethyl-3-methoxy-16α-(tetrahydropyran-2-yloxy)gona - 2,5(10)-dien-17-one in dry benzene (40 ml.), dilute with dry DMSO (120 ml.) then bubble purified acetylene through the stirring solution for 1.5 hours. Add lithium acetylide-ethylene diamine complex (3.5 g.) stir for 2 hours then add another 3.5 g. of the reagent complex and continue stirring for 1 hour. Pour the reaction into ice water, extract with ethyl acetate-ether. Then wash, dry and evaporate the extract in vacuo. Treat the residue in tetrahydrofuran with activated charcoal, filter and remove the solvent in vacuo. Cover the residue with methanol (50 ml.) add a solution of methanol (200 ml.)-conc. hydrochloric acid (30 ml.) and water (30 ml.). Gently warm the mixture on the steam bath for 5 minutes then stir at room temperature for 1 hour. Warm the reaction again for 5 minutes, stir 0.5 hour at room temperature then add water (500 ml.). Add solid sodium chloride (100 g.) and extract with ether-ethyl acetate. Wash, dry and evaporate the extract in vacuo. Dissolve the resulting oil in ether, treat with activated charcoal quickly, filter and evaporate the ether in vacuo. Crystallize the resulting oil by scratching in ether to obtain 2.20 g. of title product, M.P. 171–173°. Further purify the solid by treatment with charcoal as above in tetrahydrofuran followed by crystallization from ether to get 1.80 g. of the pure title product, M.P. 175–177°.

$\lambda_{max.}^{KBr}$ 2.95 to 3.07, 6.02 and 6.21μ. $\lambda_{max.}^{EtOH}$ 238.5 mμ (ε 17,100)

Analysis (percent): C, 76.93; H, 8.98. Calcd. for $C_{21}H_{28}O_3$ (percent): C, 76.79; H, 8.59.

EXAMPLE 11

*dl*-13-ethyl-17α-ethnyl-16α,17β-dihydroxygon-4-en-3-one

Equip a flask with magnetic stirrer, condenser and gas-inlet tube, charge with dry tetrahydrofuran (250 ml.) and 3 M ethereal methyl magnesium bromide (100 ml.) then bubble purified acetylene through the stirred solution for 2.5 hours. Add *dl*-13-ethyl-3-methoxy - 16α - (tetrahydropyran-2-yloxy)gona-2,5(10)-dien - 17 - one (3.60 g.) then gently reflux with stirring under acetylene for 3 hours. Cool and allow the reaction to stand overnight. Pour into 20% ammonium chloride solution, extract with ether-ethyl acetate then wash, dry and evaporate the extract in vacuo. Treat the resulting gum in tetrahydrofuran with activated charcoal, filter and evaporate in vacuo. Cover the gum with methanol (50 ml.) then add a previously prepared solution of methanol (100 ml.) conc. hydrochloric acid (20 ml.) and water (20 ml.). Stir for 1 hour then gently warm on the steam bath for 10 minutes. Cool, stir at room temperature 1 hour more then add water (500 ml.). Filter the precipitate onto filter-aid dry and extract with tetrahydrofuran. Filter and evaporate the solvent in vacuo, then crystallize the title product from ether to get 90 mg., M.P. 177–180°.

EXAMPLE 12 dl-13-ethyl-16α,17β-dihydroxygon-4-en-3-one

Add a solution of dl-13-ethyl-3-methoxygona-1,3,5(10)-triene-16α,17β-diol (2.00 g.) in tetrahydrofuran (100 ml.) to freshly distilled liquid ammonia (250 ml.), stir then add lithium metal (3.0 g.) in small portions over 1 hour (a Dry-Ice acetone condenser is used to maintain the temperature for liquid ammonia). Stir a further 1 hour, then add absolute ethanol dropwise to quench the blue color. Add water (200 ml.) then filter and dry the resulting precipitate of dl-13-ethyl-3-methoxygona-2,5(10)-diene-16α,17β-diol. To the crude solid add a solution of methanol (100 ml.), water (10 ml.) and conc. hydrochloric acid (10 ml.) and reflux for 2.5 hours. Cool and pour the reaction into saturated brine then extract with ether. Wash dry and evaporate the extract in vacuo. Triturate the solid with ether, filter and dry to get 715 mg. of the product, M.P. 187–188°. Further purify a sample (300 mg.) by dissolving it in warm methylene chloride, passing the solution through a bed of anhydrous magnesium sulfate and replacing the solvent with benzene by boiling on the steam-bath. Let the solution stand (add a little ether) then filter to get 230 mg. of title product, M.P. 183–184°.

$\lambda_{max.}^{KBr}$ 3.02, 6.02 and 6.22$\mu$

Analysis (percent): C, 74.81; H, 9.41. Calcd. for $C_{19}H_{28}O_3$ (percent): C, 74.96; H, 9.27.

EXAMPLE 13 dl-13-ethyl-16α,17β-dihydroxygon-4-en-3-one, 16-formate

Cool dimethylformamide (8 ml.) with a methanol-ice bath, then added methane-sulfonyl chloride (2 ml.) dropwise followed by dl-13-ethyl-16α,17β-dihydroxygon-4-en-3-one (0.50 g.). Stir the reaction at room temperature for 30 minutes then pour it into a solution of pyridine (4 ml.) in ice-water. Stir for 1 hour then extract with ether. Wash, dry and evaporate the extract in vacuo. Dissolve the resulting oil in benzene, pass through a short column of fuller's earth, then evaporate the benzene in vacuo. Crystallize from ether to get 100 mg. of the title product, M.P. 147–152°.

$\lambda_{max.}^{KBr}$ 3.02, 5.86 and 6.07$\mu$

EXAMPLE 14 dl-13-ethyl-16α-hydroxygon-4-ene-3,17-dione, formate

Cool dimethylformamide (50 ml.) with an ice-methanol bath, stir and add methanesulfonyl chloride (15 ml.) dropwise followed by dl-13-ethyl-16α,17β-dihydroxygon-4-en-3-one (3.00 g.). Stir cold for 5 minutes then at room temperature for 45 minutes. Pour the reaction into a solution of pyridine (40 ml.) and ice-water, stir for 1 hour then extract with ethyl-ethyl acetate. Wash, dry and evaporate the extract in vacuo. Treat the oil in methylene chloride-ether with activated charcoal, filter and evaporate the solvent in vacuo to get dl-13-ethyl-16α,17β-dihydroxygon-4-en-3-one, 16-formate as an oil which is best oxidized without further isolation. Dissolve this oil in acetone (60 ml.), add anhydrous sodium sulfate (5 g.), stir and cool with an ice-bath. Add 8 N chromic acid solution (3 ml.) dropwise with stirring over 1.5 hours, remove the ice bath and stir at room temperature for 5 minutes then quench by adding isopropanol (10 ml.) and water (250 ml.). Extract with ethyl acetate then wash dry and evaporate the extract in vacuo. Dissolve the residue in methylene chloride, treat with activated charcoal, filter and evaporate in vacuo, then crystallize from benzene to get 1.74 g. of pure title product, M.P. 180–183°.

$\lambda_{max.}^{KBr}$ 5.70, 5.82, 6.03 and 6.19$\mu$. $\lambda_{max.}^{EtOH}$ 239 m$\mu$ ($\epsilon$ 15,860)

Analysis (percent): C, 72.74; H, 8.16. Calcd. for $C_{20}H_{26}O_4$ (percent): C, 72.70; H, 7.93.

EXAMPLE 15 dl-13-ethyl-3-methoxy-16α-hydroxygona-3,5-dien-17-one, formate

Mix dl-13-ethyl-16α-hydroxygon-4-ene-2,17-dione, formate (2.0 g.) with dimethylformamide (18 ml.), 2,2-dimethoxypropane (18 ml.) and methanol (0.6 ml.), stir then add p-toluenesulfonic acid monohydrate (50 mg.) and reflux gently for 3.5 hours. Cool, add solid sodium bicarbonate (250 mg.) and stir for 15 minutes. Pour the reaction into ice-water, extract with ether then wash, dry and evaporate the extract in vacuo. The oil in ether and a little tetrahydrofuran treated with activated charcoal, filtered and evaporated in vacuo. The resulting oil crystallized from methanol to get 1.15 g. of title product M.P. 147–151°.

$\lambda_{max.}^{KBr}$ 5.70, 5.80, 6.07 and 6.16$\mu$

Analysis (percent): C, 73.22; H, 8.51. Calcd. for $C_{21}H_{28}O_4$ (percent): C, 73.22; H, 8.19.

EXAMPLE 16 dl-13-ethyl-17α-ethynyl-16α,17β-dihydroxygon-4-en-3-one

Equip a flask with magnetic stirrer, condenser, gas inlet tube then charge with dry tetrahydrofuran (100 ml.) and 3 M ethereal methyl magnesium bromide (40 ml.). Bubble purified acetylene through the solution for 2.5 hours then add dl-13-ethyl-3-methoxy-16α-hydroxygona-3,5-dien-17-one, formate (1.65 g.). Reflux the reaction gently under acetylene for 3 hours, cool and let stand overnight. Pour the reaction into 20% ammonium chloride solution, extract with ether-ethyl acetate then wash dry and evaporate the extract in vacuo. Dissolve the oil in ether-tetrahydrofuran, treat with activated charcoal, filter and evaporate in vacuo. Cover the oil with methanol (25 ml.) then add a solution of conc. hydrochloric acid (3 ml.), water (3 ml.) and methanol (3 ml.) and let the solution stand for 2 hours. Warm gently for 15 minutes on the steam bath, cool and add water (150 ml.). Extract with ethyl acetate and with ether. Wash, dry, and evaporate the combined extracts in vacuo. Treat the oil in methylene chloride with activated charcoal, filter and evaporate in vacuo. Crystallize the oil from ether to get 0.92 g.; M.P. 180–188°. Retreat the solid in tetrahydrofuran with activated charcoal, filter and evaporate in vacuo. Dissolve the residue in hot methylene chloride, boil and replace the solvent with ether. Let stand, then filter to get 470 mg. of title product, M.P. 181–184°.

$\lambda_{max.}^{KBr}$ 3.05, 6.02 and 6.15$\mu$. $\lambda_{max.}^{EtOH}$ 239 m$\mu$ ($\epsilon$ 16,600)

I claim:
1. A compound of the structure

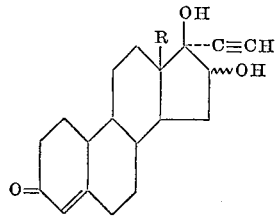

wherein R is alkyl of from 1 to 4 carbon atoms.

2. The compound according to claim 1, 16α,17β-dihydroxy-13β-ethyl-17α-ethynylgon-4-en-3-one.

3. The compound according to claim 1, 16β,17β-dihydroxy-13β-ethyl-17α-ethynylgon-4-en-3-one.

4. A compound of the structure
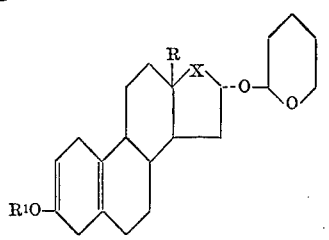
wherein R is alkyl of from 1 to 4 carbon atoms, R¹ is alkyl of from 1 to 8 carbon atoms, and X is C=O or
References Cited
UNITED STATES PATENTS
3,519,714  7/1970  Hughes et al. _____ 424—238
HENRY A. FRENCH, Primary Examiner
U.S. Cl. X.R.
260—397.4, 999